July 19, 1955  T. F. SARAH  2,713,463
SPINNING REEL

Filed July 30, 1953  2 Sheets-Sheet 1

INVENTOR.
THOMAS F. SARAH
ATTYS.

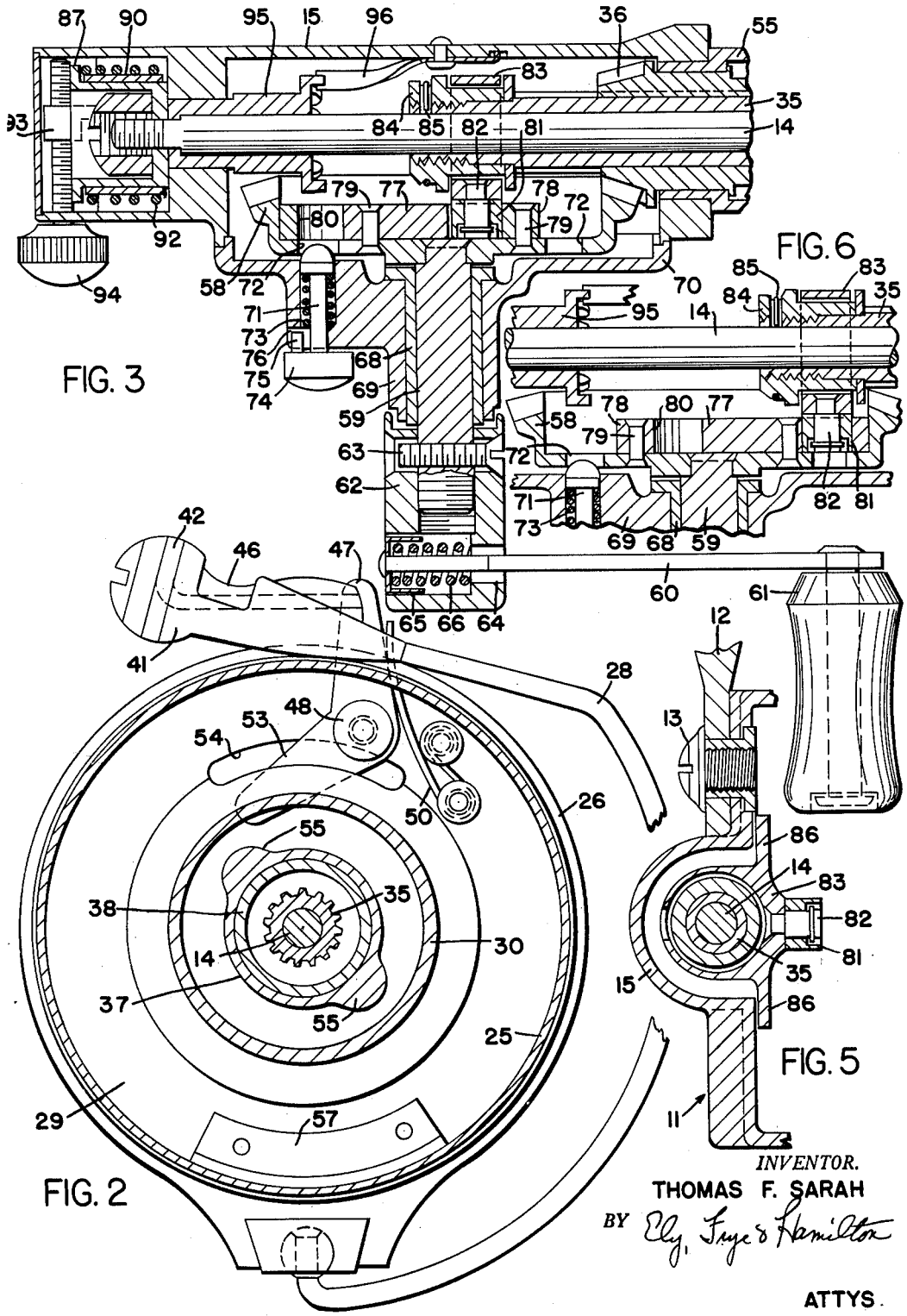

United States Patent Office 2,713,463
Patented July 19, 1955

2,713,463

SPINNING REEL

Thomas F. Sarah, Akron, Ohio, assignor to The Enterprise Manufacturing Company, Akron, Ohio, a corporation of Ohio Application July 30, 1953, Serial No. 371,385

7 Claims. (Cl. 242—84.4)

This invention relates generally to spinning reels in which the line pays out from a non-rotatable spool during casting, and a pick-up arm guides the line onto the spool during winding, as either the arm or the spool is rotated, the arm being manually swung out of the way at the start of a casting operation.

It is an object of the present invention to provide an improved spinning reel construction having a rotatable carrier for the pick-up arm which is automatically reciprocated as the carrier is rotated so as to level wind the line on the spool.

Another object is to provide a spinning reel having improved bearing means for solidly supporting the pick-up arm carrier at all times.

A further object is to provide a spinning reel having improved brake means located at the rear of the reel where it can be adjusted when the line is payed out to play a fish, without interfering with the line in any way.

A still further object is generally to improve and simplify the construction of spinning reels.

These and other objects are accomplished by the improvements comprising the present invention, a preferred embodiment of which is shown by way of example in the accompanying drawings and described in detail in the specification hereof. Various modifications and changes in details of construction may be made within the scope of the invention as defined in the appended claims.

Referring to the drawings hereof:

Fig. 2 is a transverse section as on line 2—2, Fig. 1;

Fig. 3 is a fragmentary section on line 3—3, Fig. 1;

Fig. 5 is a fragmentary section on line 5—5, Fig. 1; and

Fig. 6 is a fragmentary section similar to Fig. 3, showing the carrier reciprocating means in another position.

Figures 1, 4:
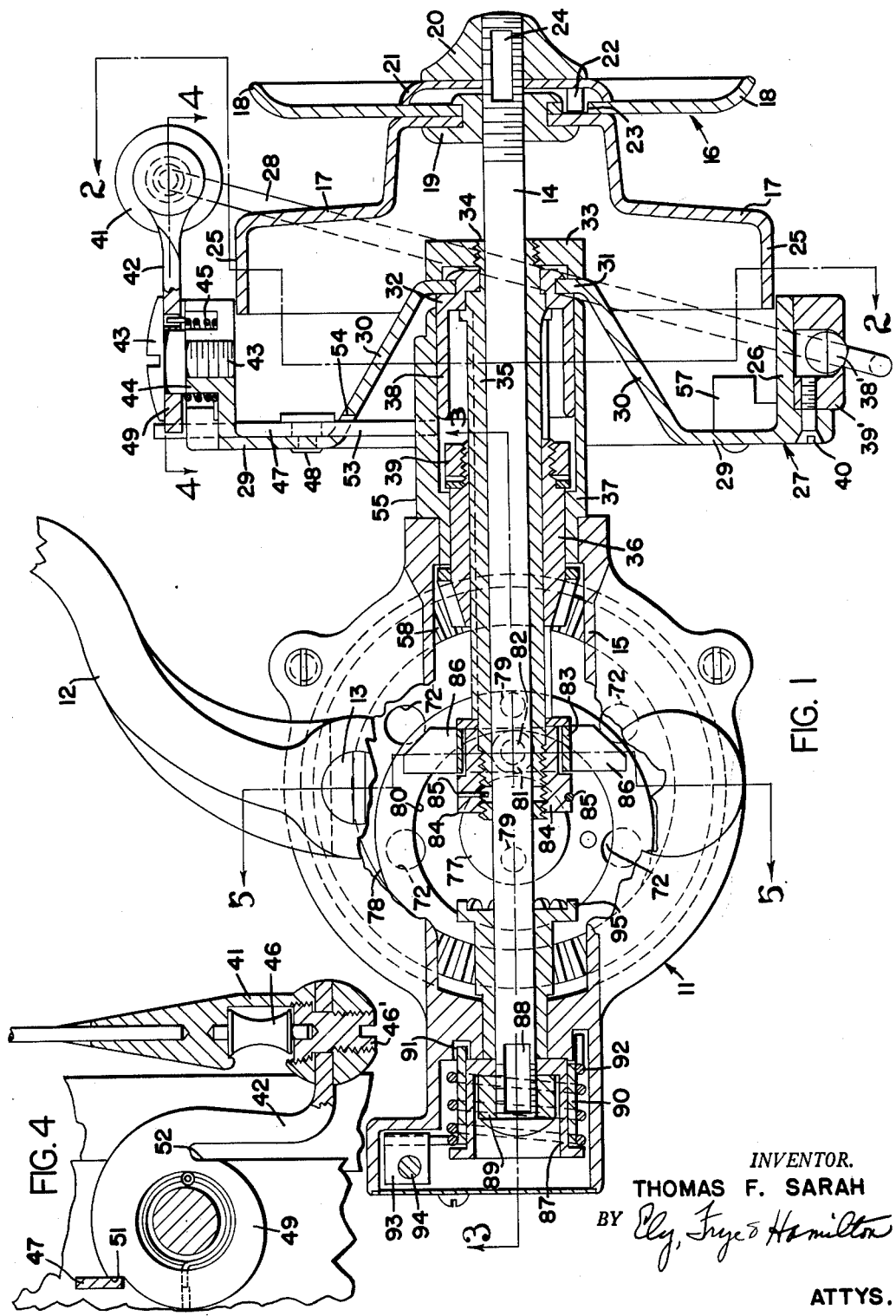
Fig. 1 is a sectional view, partly in elevation, taken along the axis of the spool shaft with the pick-up arm in line winding position.
Fig. 4 is a fragmentary section on line 4—4, Fig. 1.

Referring to Fig. 1, the reel housing indicated generally at 11 has the usual bracket arm 12 secured thereto by a screw 13 for attaching the reel to a rod (not shown), the rod being parallel to the spool shaft 14 which is mounted in a rounded portion 15 of the housing on the side opposite to the crank handle. The shaft 14 is normally non-rotatable and has the spool 16 fixed on its outer end. The inner and outer spool flanges 17 and 18, respectively, are seated in a groove in a nut 19 which is screwed on the shaft.

A lock nut 20 is screwed on the outer end of the shaft 14 for holding the spool in adjusted position thereon. A cupped washer 21 is interposed between the nuts 19 and 20 and has an inwardly projecting pin 22 entered in a hole 23 which is one of a circular series of holes in the outer spool flange 18. The washer 21 is non-rotatively mounted on the flatted portion 24 of the shaft 14. Thus, the spool may be adjusted axially on the shaft by removing the lock nut 20 and washer 21, and screwing the nut 19, carrying the spool, in or out on the shaft. Then the washer 21 is replaced and the pin 22 entered in a hole 23 located substantially in register therewith.

The inner spool flange 17 has an inturned lip 25 which is telescopically received within the outer annular flange 26 of a carrier or flyer 27 which carries the pick-up arm or bail 28. This carrier 27 is rotatable on shaft 14, and its rear wall 29 preferably has a re-entrant conical portion 30 which extends the bearing support forwardly within the lip 25 of the spool flange 17. The inner annular flange 31 of portion 30 is preferably seated in a groove in a bushing 32, and the bushing is secured by a nut 33 on the flatted reduced front end 34 of a tubular drive shaft 35 which is rotatable and slidable on spool shaft 14.

A bevel pinion gear 36 is splined on the tubular shaft 35 and the pinion is journaled within a bearing sleeve or bushing 37, the rear end of which is secured in housing portion 15, and the front end is slidably and rotatably supported on a rearward extension 38 of bushing 32. Longitudinal movement of the pinion gear 36 rearwardly of the bearing sleeve 37 is prevented by a nut 39 screwed on the pinion within the sleeve. Thus, as the pinion gear 36 is driven it rotates the shaft 35 to rotate the carrier 27, and at the same time the shaft may slide back and forth on the spool shaft 14 to reciprocate the carrier and level wind the line on the spool. The extension 38 slidably engaged in sleeve member 37 provides an elongated bearing support for the carrier to prevent wobble of the carrier as it slides back and forth on the shaft. At the same time, the overlapping contact between the sleeve 37 and extension 38 protects the splines on hollow shaft 35 from dirt and foreign matter.

The pick-up arm 28 consists of a wire loop having its ends mounted at diametrically opposite positions on the carrier flange 26. One end of the arm 28 preferably has a ball joint 38' universally mounted in a socket member 39' secured on the carrier by a screw 40. The other end of arm 28 may be connected to a line guide bracket 41 which is mounted on a pivot arm 42 journaled on the shank of a pivot screw 43 threaded into a boss 44 on carrier flange 26. A torsion spring 45 engirdles the boss 44 and has one end secured in the arm 42 and its other end secured to the carrier flange 26. The spring 45 urges the pick-up arm to its line guiding position of Fig. 1.

As shown in Figs. 1 and 2, the bracket 41 has a line guide roller 46 journaled in a notch therein and a conical portion formed on the bracket guides the line from the arm into the roller as the arm swings into winding position with the roller positioned over the spool. The roller is adjustably and removably mounted in the bracket 41 by a screw 46' which connects the pick-up to the pivot arm 42.

A latch lever 47 is pivoted at 48 on the rear wall of the carrier 27 for locking the pick-up in the winding position shown in Figs. 1, 2 and 4 or in a casting position at 180° thereto. The outer end of the lever 47 projects through a slot in the carrier flange 26 to engage a cam 49 on the pivot arm 42. As shown in Fig. 2, the lever is held against the cam by a leaf spring 50. In the winding position the lever engages a shoulder 51 on the cam and in the casting position, the lever engages a shoulder 52 on the cam.

At the start of a casting operation, the fisherman holds the line away from the pick-up arm with the finger of his right hand which is holding the rod, and then manually swings the pick-up arm through 180° to an out-of-the-way position where the lever 47 engages shoulder 52 on the cam and latches the pick-up arm in that position. The inner end 53 of lever 47 projects through an arcuate slot 54 at the base of the conical wall 30 and into the path of rounded ribs 55 on sleeve 37 (Fig. 2). At the beginning of the line winding operation, one of the ribs 55 is engaged by the inner end 53 of the latch lever and releases it from shoulder 52, whereupon the spring 45 swings the pivot arm and pick-up arm through 180° to the winding position where shoulder 51 engages the latch lever. It will be noted that shoulder 51 is spaced outward radially from the pivot screw a greater distance than shoulder 52, so that the ribs 55 do not engage the latch lever 47 in the winding position. A counterweight 57 may be secured to the rear wall 29 of the carrier diametrically opposite the line guide bracket 41, to counterbalance the line guide and latch mechanism.

The pinion gear 36 meshes with a bevel gear 58 mounted in the housing 11 on the inner end of a crank shaft 59 extending at right angles to the spool shaft 14. On the outer end of shaft 59 is secured a crank handle 60. The handle 60 is preferably mounted for swinging through 180° to turn the knob 61 to an out-of-the-way position for storing and shipping.

The handle 60 extends transversely through the end of a nut member 62 screwed on the end of the shaft 59 and locked in position by a screw 63 threaded through the shaft. The handle is rectangular in cross section and normally engaged in a slot 64 in the nut member for turning the nut and shaft, while the inner end of the handle has a cap 65 thereon and within the nut member the handle is reduced in cross section so that it will turn in slot 64. A spring 66 surrounds the handle within the nut member. By pulling outwardly on the handle to compress the spring, the reduced section is entered in slot 64 so that the handle and knob can be turned through 180°.

The shaft 59 is journaled in a bushing 68 mounted in a boss 69 formed in a housing cap 70. In one side of the boss 69 is mounted a ratchet pin 71, the inner end of which is beveled off to slip over a series of holes 72 in the web of the bevel gear 58 when the gear is rotated in a direction to wind the line on the spool, and which engages any one of the holes to prevent reverse rotation of the gear. A spring 73 around the pin urges its inner end into engagement with said holes 72. The head 74 of the pin has an offset pin 75 on its underside normally entered into a slot 76 in the housing boss to maintain the inclined end in proper position relative to the holes 72. By pulling outwardly on the head 74 sufficiently to withdraw the offset pin 75 from its slot, the head may be rotated to hold the pin 75 out of the slot and the ratchet pin disengaged from the bevel gear 58, so that the line may be wound without causing the clicking noise of the ratchet slipping over the holes 72.

A pair of circular cams consisting of an inner ring 77 and an outer ring 78 is mounted within the bevel gear 58 on the web or transverse wall thereof by means of dowels 79. A circular roller guide channel 80 is formed between the two cam rings eccentric of the crank shaft 59. A cam roller 81 rides in said channel 80 and is carried by a pin 82 on a yoke 83 which engirdles a nut 84 screwed on the inner end of hollow shaft 35 and locked in position by a retaining ring 85. In Figs. 1 and 3 the cam roller 81 and yoke 83 are located to position the shaft 35 and the carrier 27 thereon at the left end of its stroke, and it will be apparent that as the gear 58 is rotated the cam rings 77 and 78 will shift the roller 81 and the yoke to the right to the opposite end of its stroke as shown in Fig. 6. The length of the stroke is substantially equal to the distance between spool flanges 17 and 18 so that the reciprocation of the carrier will level wind the line as the carrier is rotated with the pick-up arm in winding position over the spool. As shown in Figs. 1 and 5, the yoke 83 is provided with lateral arms 86 which ride on the inner surface of the housing 11 to prevent the yoke from rotating as it reciprocates the shaft 35.

A friction brake is provided at the rear end of the shaft 14 for allowing the shaft to turn when the pull on the line exceeds a predetermined amount, so as to prevent breaking of the line. The brake includes a brake drum 87 non-rotatably secured on the flatted end portion 88 of the shaft by a nut 89. A brake shoe in the form of a split nylon sleeve 90 surrounds the drum and has a projection 91 entered into a recess in the housing preventing turning of the sleeve. A torsion spring 92 surrounds said sleeve and frictionally clamps it against the drum, the inner end of the spring being anchored in the housing and the outer end secured in a nut 93 threaded on an adjustment screw 94. Thus, turning of the screw 94 adjusts the amount of drag on the brake.

A click or ratchet device is preferably provided to warn the fisherman when the drag or pull on the line is sufficient to overcome the friction of the brake, so that he will not continue to reel in on the line and cause it to twist, which creates loops in the line on subsequent casting. Such device may consist of a toothed ratchet wheel 95 secured on the spool shaft preferably near its rear end, and engaged by the end of a spring arm 96 mounted on housing portion 15, as shown in Fig. 3.

In the operation of the improved spinning reel, the fisherman holds the rod in his right hand, and at the start of a cast with the line reeled in, he extends his right index finger to hold the line at one side of the spool. Then with the left hand he swings the pick-up arm 28 past the line through 180° where it is held by the latch lever 47. When the cast is made the line is released from the finger and spins out or unreels axially from the outer end of the stationary spool until the bait strikes the water.

When the crank is turned to reel in the line, the inner end of the latch lever strikes one of the ribs 55 on bushing 37 and releases the other end of the lever from its engagement with the cam 49, allowing the spring 45 to snap the pick-up arm 28 to the position of Fig. 1 where it engages the incoming line and guides it onto the roller 46. The roller 46 is positioned over the spool, and as the carrier is reciprocated during the winding the roller moves back and forth over the spool to level wind the line thereon. If the relative position of the spool on the shaft needs adjusting to correct the level winding operation, this is quickly and easily accomplished by removing lock nut 20 and washer 21 and turning the spool, as previously described.

During the winding operation, the location of bushing 32 within the spool flange 17 provides a solid support for the carrier close to the spool, and the extension 38 on bushing 32 provides an elongated bearing surface preventing wobbling or out of balance rotation of the carrier.

What is claimed is:

1. A spinning reel having a spool shaft, a spool fixed on the shaft, a hollow shaft slidable and rotatable on said spool shaft, a carrier having a pick-up arm, a bearing bushing supporting said carrier on said hollow shaft and extending toward the rear of the carrier, a pinion splined on said hollow shaft for relative sliding movement, a driving gear meshing with said pinion, eccentric means on said driving gear operatively connecting said gear to said hollow shaft for reciprocating said carrier as it is rotated by said gear, and a bearing sleeve journaling said pinion behind said bearing bushing and slidably overlapping the same.

2. In a spinning reel having a housing, a spool shaft mounted in the housing and a spool fixed on the outer end of the shaft, a hollow shaft slidable and rotatable on said spool shaft, a carrier having a pick-up arm, a bearing bushing supporting said carrier on said hollow shaft and extending toward the rear of the carrier, a pinion splined on said hollow shaft for relative sliding movement, a driving gear meshing with said pinion, eccentric means on said driving gear operatively connecting said gear to said hollow shaft for reciprocating said carrier as it is rotated by said gear, and a bearing sleeve journaling said pinion in said housing and extending forwardly therefrom in slidably overlapping relation to said bearing bushing.

3. In a spinning reel having a housing, a spool shaft mounted in the housing and projecting therefrom, and a spool fixed on the outer end of said shaft, a hollow shaft slidable and rotatable on said spool shaft, a bail carrier behind said spool having a central reentrant portion extending forwardly within said spool, a bearing bushing fixedly supporting said reentrant portion on said hollow shaft and extending rearwardly from said reentrant portion, a pinion splined on said hollow shaft, a driving gear in the housing meshing with said pinion, eccentric means on said driving gear operatively connecting said gear to said hollow shaft for reciprocating said carrier as it is rotated, and a bearing sleeve journaling said pinion in said housing and slidably overlapping said bearing bushing.

4. In a spinning reel having a housing, a spool shaft mounted in the housing and projecting therefrom, and a spool fixed on the outer end of said shaft, a hollow shaft slidable and rotatable on said spool shaft, a bail carrier behind said spool having a central reentrant portion extending forwardly within the spool, a bearing bushing fixedly supporting said reentrant portion on the outer end of said hollow shaft and extending rearwardly therefrom, a pinion splined on said hollow shaft, a driving gear in said housing meshing with said pinion, eccentric means on said driving gear, means operatively connecting said eccentric means to the inner end of said hollow shaft for reciprocating said hollow shaft as it is rotated, and a bearing sleeve in said housing journaling said pinion and extending forwardly in slidable overlapping engagement with said bearing bushing.

5. In a spinning reel having a housing, a spool shaft mounted in the housing and projecting therefrom, and a bail carrier rotatably mounted on said shaft, means in the housing for rotating said carrier and reciprocating it during rotation, a spool member threaded on said shaft, a retaining nut screwed on the outer end of said shaft, and a lock washer member non-rotatively mounted on said shaft between said nut and said spool member, one of the members having a circular series of holes therein, and the other member having a pin detachably engaged with one of said holes.

6. In a spinning reel having a housing, a spool shaft mounted in the housing and projecting therefrom, a spool fixed on the outer end of said shaft, and a bail carrier rotatably mounted on said shaft, means in the housing for rotating said carrier, friction brake means on the inner end of said shaft for placing a predetermined amount of drag on the shaft against turning in said housing, said brake means including a brake drum on the shaft, a nylon brake sleeve around the drum and fixed in the housing, a torsion spring around the sleeve for frictionally clamping the sleeve around the drum, and means for adjusting the amount of tension in said spring.

7. A spinning reel having a spool shaft, a spool fixed on the shaft, a hollow shaft slidable and rotatable on said spool shaft, a carrier having a pick-up arm, bushing means supporting said carrier on said hollow shaft closely adjacent to said spool, a pinion splined on said hollow shaft rearwardly of said carrier, a driving gear meshing with said pinion, eccentric means on said driving gear operatively connecting said gear to said hollow shaft for reciprocating said carrier as it is rotated by said gear, and a bushing on said pinion slidably overlapping said carrier bushing.

References Cited in the file of this patent

UNITED STATES PATENTS

| | | |
|---|---|---|
| 2,035,279 | Shakespeare, Jr. | Mar. 24, 1936 |
| 2,136,111 | Laurent | Nov. 8, 1938 |
| 2,428,324 | Worden | Sept. 30, 1947 |
| 2,548,073 | Siegrist | Apr. 10, 1951 |
| 2,632,608 | Vincent | Mar. 24, 1953 |

FOREIGN PATENTS

| | | |
|---|---|---|
| 1,106 | Great Britain | of 1912 |
| 354,960 | Great Britain | Aug. 20, 1931 |
| 409,833 | Great Britain | May 10, 1934 |
| 878,594 | France | Oct. 19, 1942 |
| 957,557 | France | Aug. 29, 1949 |
| 1,020,118 | France | Nov. 12, 1952 |